(12) United States Patent
Kakumu

(10) Patent No.: US 9,308,612 B2
(45) Date of Patent: Apr. 12, 2016

(54) MACHINE TOOL HAVING STOPPER FOR PREVENTING CHIPS FROM ENTERING MACHINE TOOL

(71) Applicant: FANUC Corporation, Yamanashi (JP)

(72) Inventor: Masahiro Kakumu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/326,965

(22) Filed: Jul. 9, 2014

(65) Prior Publication Data

US 2015/0016913 A1 Jan. 15, 2015

(30) Foreign Application Priority Data

Jul. 10, 2013 (JP) ................................. 2013-144746

(51) Int. Cl.
| | | |
|---|---|---|
| *B23Q 11/08* | (2006.01) | |
| *B23Q 1/01* | (2006.01) | |
| *B23C 1/06* | (2006.01) | |
| *B23C 9/00* | (2006.01) | |
| *B23Q 11/00* | (2006.01) | |

(52) U.S. Cl.
CPC ............. *B23Q 11/0875* (2013.01); *B23C 1/06* (2013.01); *B23C 9/00* (2013.01); *B23Q 11/08* (2013.01); *B23Q 11/0825* (2013.01); *B23C 2230/00* (2013.01); *B23Q 1/01* (2013.01); *B23Q 1/017* (2013.01); *B23Q 11/0042* (2013.01); *Y10T 409/304088* (2015.01); *Y10T 409/304536* (2015.01)

(58) Field of Classification Search
CPC ............. Y10T 409/30392; Y10T 409/304088; B23Q 11/0875; B23Q 11/08; B23Q 11/0825; B23Q 11/0042; B23Q 1/01; B23Q 1/017
USPC .................................................. 409/134, 137
See application file for complete search history.

(56) References Cited

U.S. PATENT DOCUMENTS

| | | | | |
|---|---|---|---|---|
| 1,938,786 | A * | 12/1933 | Vancil .............................. | 384/13 |
| 2,555,223 | A * | 5/1951 | Cox ................................. | 384/15 |
| 2,788,716 | A * | 4/1957 | McFerren ....................... | 409/235 |
| 3,515,444 | A * | 6/1970 | Grabner .......................... | 384/15 |
| 5,263,800 | A * | 11/1993 | Chen .............................. | 409/137 |
| 5,379,480 | A * | 1/1995 | Lo ................................... | 15/246 |
| 5,893,691 | A * | 4/1999 | Nakajima et al. ............. | 409/235 |
| 2004/0047700 | A1 * | 3/2004 | Maeda .......................... | 409/134 |

FOREIGN PATENT DOCUMENTS

| | | | | |
|---|---|---|---|---|
| DE | 2346766 A1 * | 3/1975 | ......... | B23Q 11/0875 |
| DE | 3531140 C1 * | 7/1986 | ......... | B23Q 11/0875 |
| DE | 29917894 U1 * | 1/2000 | ......... | B23Q 11/0875 |

(Continued)

OTHER PUBLICATIONS

Decision to grant a patent mailed Sep. 30, 2014, corresponding to Japanese patent application No. 2013-144746.

*Primary Examiner* — Sunil K Singh
*Assistant Examiner* — Ryan Rufo
(74) *Attorney, Agent, or Firm* — Hauptman Ham, LLP

(57) ABSTRACT

In a machine tool, a saddle is supported by a guide disposed on a bed. A cover protecting the guide is secured to the saddle and moves together with the saddle to enter or leave a space formed under a column. A chip intrusion stopper is attached to the column to prevent chips from entering the space when the cover and the saddle enter the space.

5 Claims, 4 Drawing Sheets

(56) References Cited

FOREIGN PATENT DOCUMENTS

| | | | | |
|---|---|---|---|---|
| DE | 102010039206 A1 * | 2/2012 | | B23Q 11/0825 |
| EP | 1524071 A1 * | 4/2005 | | B23Q 11/0825 |
| JP | 200668823 A | 3/2006 | | |
| JP | 2006-123053 A * | 5/2006 | | B23Q 11/08 |
| JP | 2006123045 A | 5/2006 | | |
| JP | 2007-061952 A | 3/2007 | | |
| JP | 2013193196 A | 9/2013 | | |
| SU | 990471 A1 * | 1/1983 | | B23Q 1/01 |

\* cited by examiner

MACHINE TOOL HAVING STOPPER FOR PREVENTING CHIPS FROM ENTERING MACHINE TOOL

RELATED APPLICATIONS

The present application claims priority to Japanese Application Number 2013-144746, filed Jul. 10, 2013, the disclosure of which is hereby incorporated by reference herein in its entirety.

BACKGROUND OF THE INVENTION

1. Field of the Invention

The present invention relates to a machine tool having a stopper that prevents chips from entering the machine tool while it is used.

2. Description of the Related Art

Machines tools are generally structured so that a protective cover is installed over their driving parts and their surroundings in order to prevent chips generated during machining from accumulating on the driving parts and their surroundings.

According to a disclosure in Japanese Patent Application Laid-Open No. 2007-61952, a feed screw and a linear motion guide, which are used to drive a saddle in a front-rear direction of a machine tool, are protected from chips by a protective cover installed over the saddle. The protective cover installed over the saddle moves in the front-rear direction in conjunction with the motion of the saddle, and enters and leaves a space under a column to prevent chips from accumulating on the feed screw and the linear motion guide. Further, a wiper is mounted on the column to scrape off the chips accumulated on the protective cover. When the protective cover moves in the front-rear direction, the wiper removes the chips accumulated on the surface of the protective cover.

Meanwhile, when the protective cover moves in conjunction with the saddle, a certain clearance needs to be provided between the protective cover and the linear motion guide and the linear motion guide mounting surface to prevent the interference. Hence, the chips may accumulate on the linear motion guide mounting surface, parts near the linear motion guide mounting surface, or the linear motion guide.

When the protective cover moves toward the column in conjunction with the saddle, the accumulated chips may be pushed by the protective cover and moved on the linear motion guide mounting surface or the parts near the linear motion guide mounting surface. However, no member is provided to block the movement of the chips that are pushed by the protective cover. As a result, the chips drop into a space formed under the column (the space for accepting a part of the protective cover). Another problem is that the chips are left accumulated on the linear motion guide mounting surface, the parts near the linear motion guide mounting surface, or the linear motion guide.

SUMMARY OF THE INVENTION

In view of the above-described problems in the prior art techniques, an object of the present invention is accordingly to provide a machine tool having a stopper that prevents the chips from entering the machine tool while it is used.

The machine tool according to the present invention includes a column, a saddle, and a protective cover. The column is erected on a bed. The saddle is supported by a guide mounted on the bed and moves in a direction toward or away from the column. The protective cover is secured to the saddle, moves together with the saddle to enter or leave a space formed under the column, and protects the guide. Further, the stopper is attached to the column, a member to be connected to the column, the bed, or a member to be connected to the bed in such a manner that the stopper faces a surface of the protective cover that opposes the bed and inhibits chips from entering the space formed under the column.

A wiper for scraping off the chips may be mounted on the saddle or the member connected to the saddle in a manner such that the wiper faces the guide, the surface for mounting the guide, or a tilted portion of the surface for mounting the guide.

According to the present invention, it is possible to provide a machine tool having a stopper that prevents the chips from entering the machine tool while it is used.

BRIEF DESCRIPTION OF THE DRAWINGS

The above and other objects and features of the present invention will be apparent from the following description of embodiments that are given with reference to the appended drawings, in which.

DETAILED DESCRIPTION OF THE PREFERRED EMBODIMENT

Figure 1:
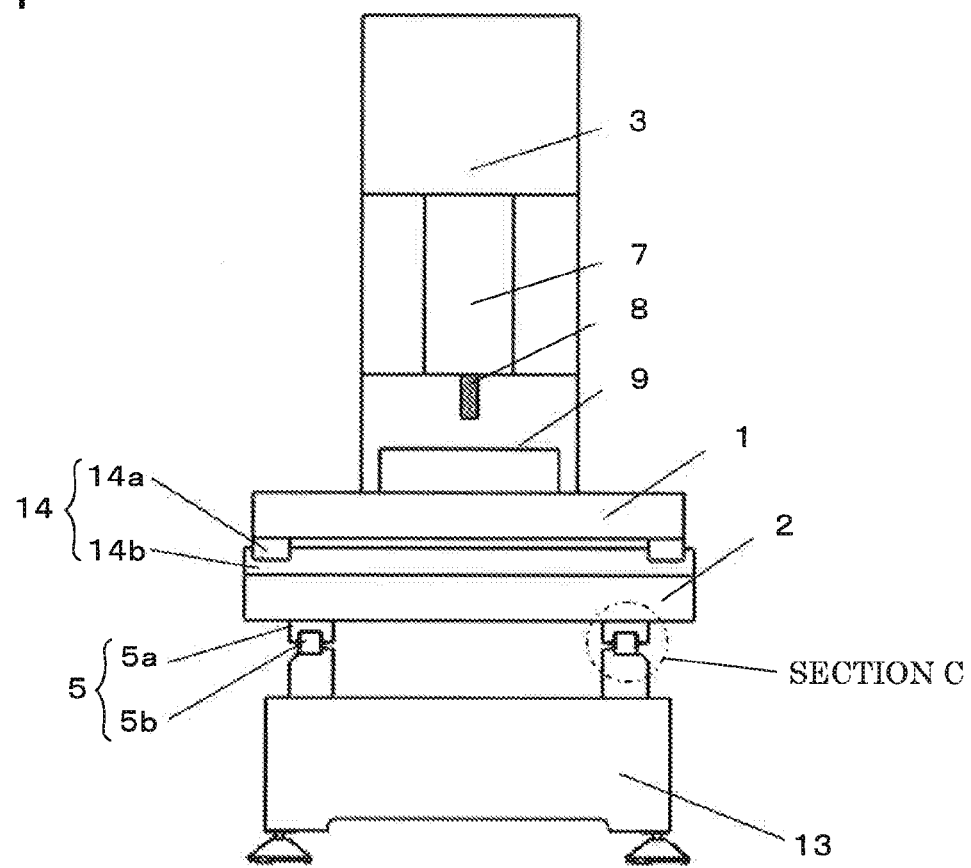
FIG. 1 is a front view of a machine tool having a table on which a workpiece is placed and which is placed on a bed through a saddle.

An embodiment of a machine tool to which the present invention is applied will now be described.

The machine tool is configured so that a saddle 2 is supported on a bed 13 through a pair of first linear motion guides 5, and that a table 1 on which a workpiece 9 is to be placed is supported on the saddle 2 through a pair of second linear motion guides 14. A column 3 is erected on the rear top of the bed 13. A spindle 7 to which a tool 8 is attached is secured to the top of the column 3.

The first linear motion guides 5 include a linear motion block 5a and a linear motion rail 5b. The linear motion block 5a is secured to the saddle 2. The linear motion rail 5b is secured to a linear motion rail mounting surface 6a, which is formed on the bed 13. The second linear motion guides 14 include a linear motion block 14a, which is secured to the table 1, and a linear motion rail 14b, which is secured to the saddle 2. The saddle 2 is movable in the longitudinal-axis direction of the first linear motion guides 5. The table 1 is movable in the longitudinal-axis direction of the second linear motion guides 14.

When a drive mechanism (not shown) relatively moves the spindle 7 and the table 1 in three-axis directions within a machining space, the machine tool performs a cutting work with respect to the workpiece 9 placed on the table 1. Chips are generated during the cutting work.

Figure 2:
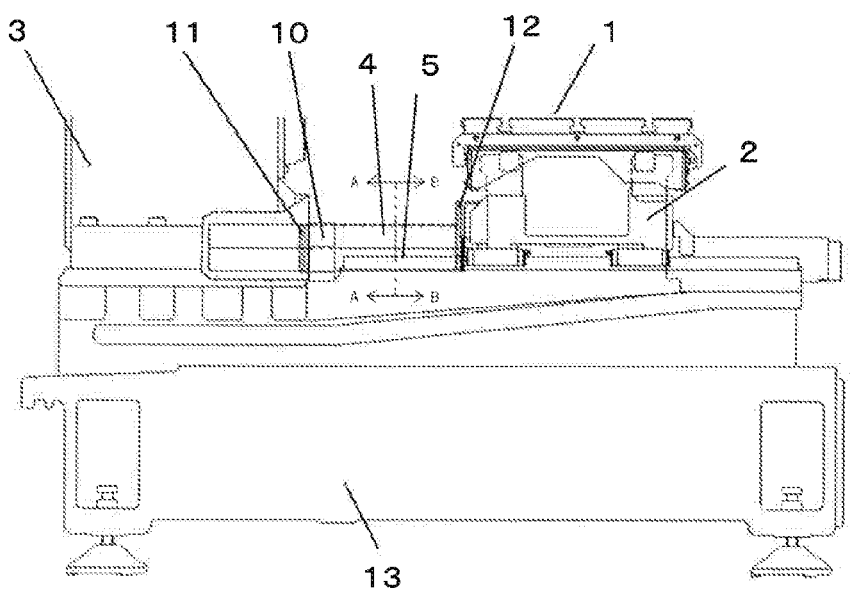
FIG. 2 is a left side view of the machine tool shown in FIG. 1.
Figure 3:
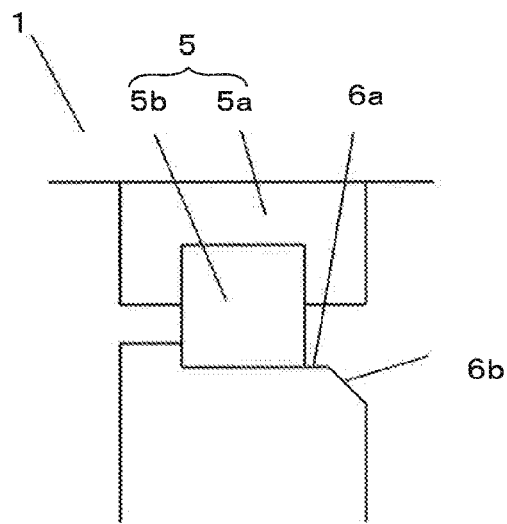
FIG. 3 is an enlarged view of section C, which is circled by a one-dot chain line in FIG. 1.
Figure 4:
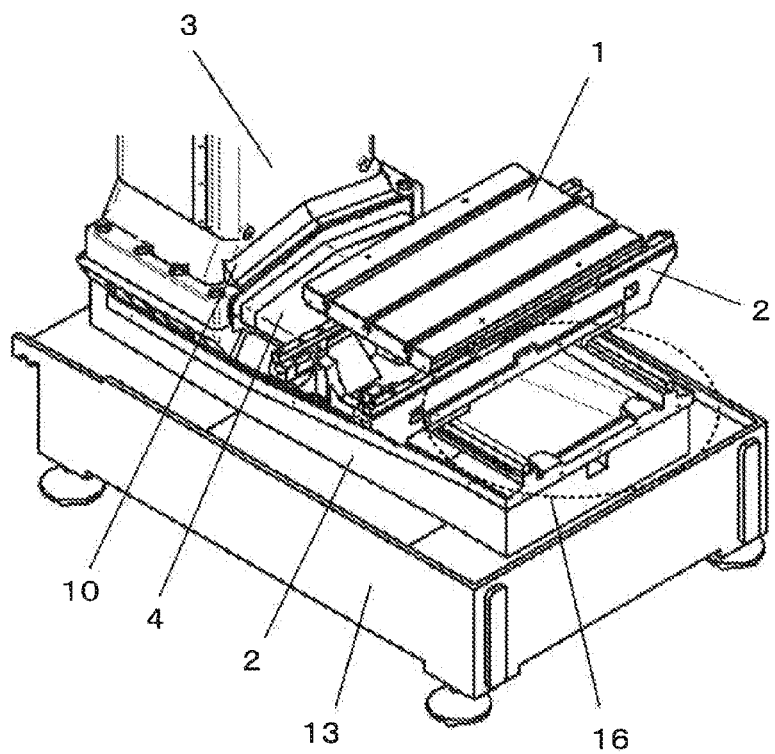
FIG. 4 is a perspective view illustrating the structure of the machine tool shown in FIG. 1.

As shown in FIGS. 2 and 4, a protective cover 4 is attached through a first wiper 12 to a lateral surface of the saddle 2 that opposes the column 3. The protective cover 4 inhibits the chips from entering and accumulating on the rail surface of the linear motion rail 5b, the linear motion rail mounting surface 6a, or a tilted portion 6b of the linear motion rail mounting surface. As shown in FIG. 3, the tilted portion 6b of the linear motion rail mounting surface is formed with its surface tilted outward to avoid the accumulation of the chips. Although FIG. 3 indicates that the tilted surface is flat, it may be curved.

Figure 5:
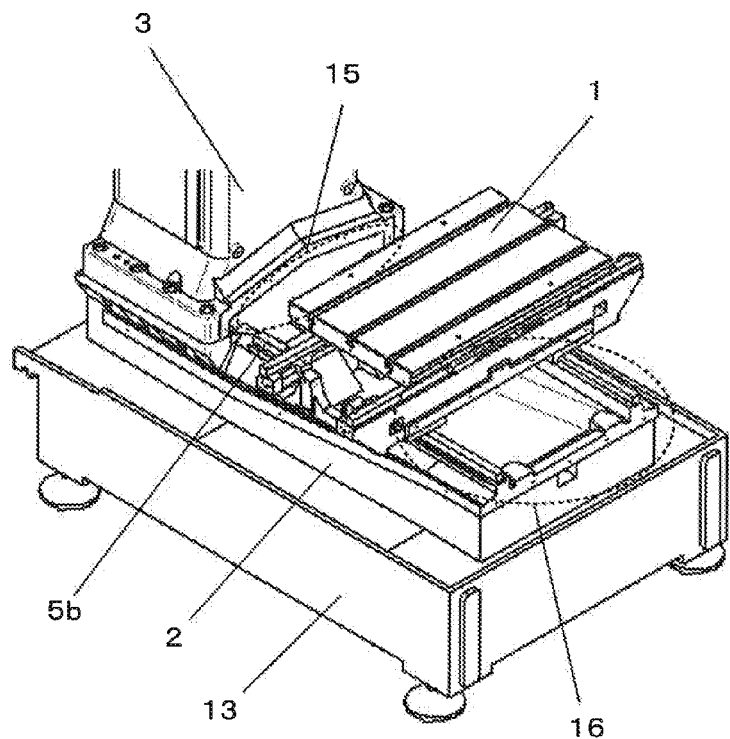
FIG. 5 is a diagram illustrating a space formed under a column of the machine tool shown in FIG. 1.

Meanwhile, a protective-cover intrusion space 15 is formed under the column 3 and on a side opposing the saddle 2 as shown in FIGS. 2 and 5. The protective-cover intrusion space 15 is formed under the column 3 and used as a relief space for the protective cover 4 so that the movement of the protective cover 4 remains unobstructed when the saddle 2 moves toward the column 3.

A second wiper 10 is attached to the column 3 to ensure that the chips accumulated on the upper surface of the protective cover 4, which moves toward the column 3 together with the saddle 2, do not intrude into the protective-cover intrusion space 15 provided for the column 3.

Reference numeral 16 in FIGS. 4 and 5 denotes a telescopic cover mount.

The chips may enter the inside of the protective cover 4 (that is, a space over the bed 13 covered by the protective cover 4) and accumulate on the first linear motion guides 5, the linear motion rail mounting surface 6a, and the tilted portion 6b of the linear motion rail mounting surface, which is disposed adjacent to the linear motion rail mounting surface 6a. When the protective cover 4 moves together with the saddle 2, the accumulated chips are pushed by the protective cover 4 or the first wiper 12 and moved toward the column 3 (more specifically, toward the protective-cover intrusion space 15 formed under the column 3).

As such being the case, a chip intrusion stopper 11 is directly secured to the column 3 or the bed 13 or secured to a member fastened to the column 3 or the bed 13 as shown in FIG. 2 in order to prevent the chips from dropping into the protective-cover intrusion space 15.

A configuration of the chip intrusion stopper 11 will now be described with reference to FIGS. 6 and 7.

The chip intrusion stopper 11 is fastened to the bottom of the column 3 with screws driven into screw holes 11a (FIG. 7) (more specifically, the chip intrusion stopper 11 is disposed to face the inner surface of the protective cover 4 so as to close the inlet portion of the protective-cover intrusion space 15 formed under the column 3). The chip intrusion stopper 11 is a flat plate whose outer circumference is chevron-shaped to match the inner shape of the protective cover 4. If the upper surface of the protective cover 4 is formed in parallel with the upper surface of the bed 13, the outer circumference of the chip intrusion stopper 11 should be rectangle-shaped.

Figure 6:
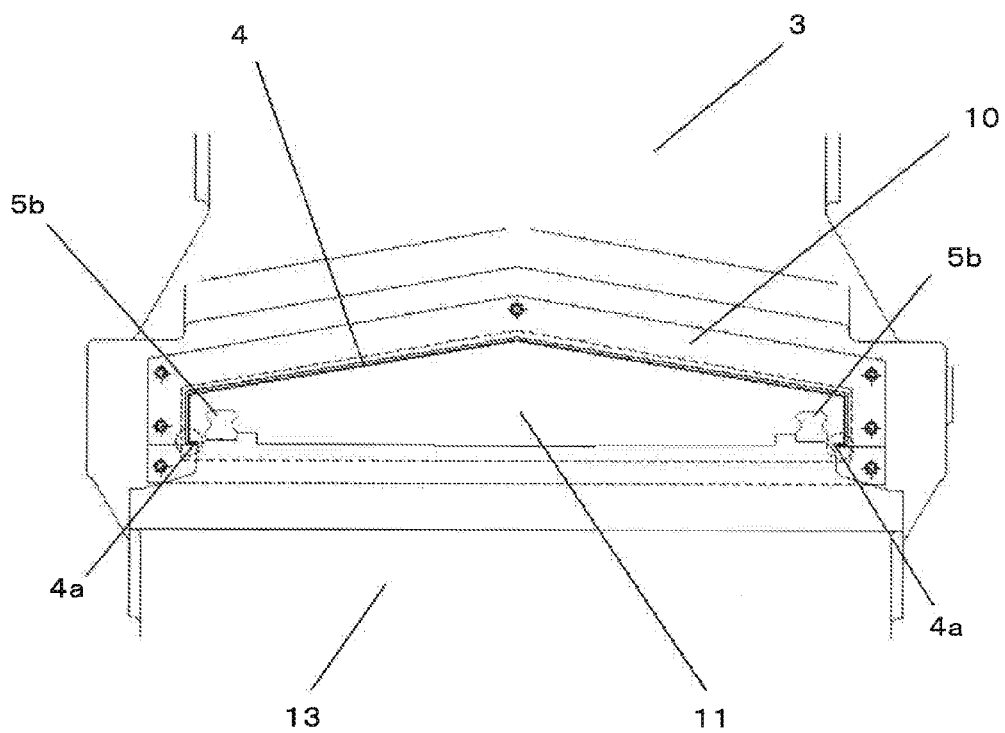
FIG. 6 is a view of the machine tool taken in the direction of arrows A in FIG. 2.
Figure 7:
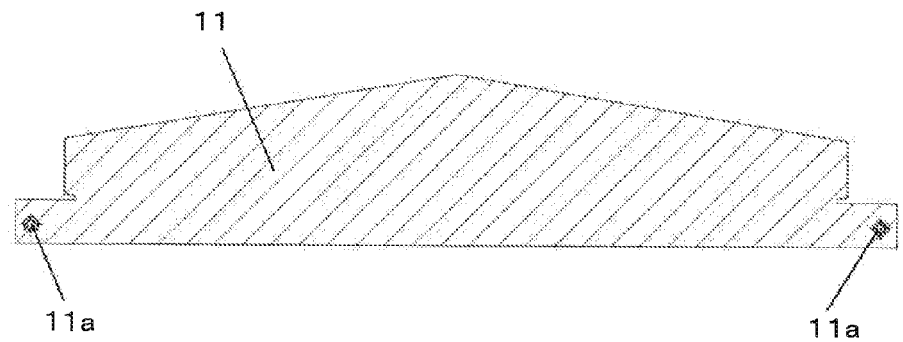
FIG. 7 is an enlarged view of a stopper shown in FIG. 6.

As shown in FIGS. 2 and 6, the chip intrusion stopper 11 may be secured to the column 3 so as to slide along the inner surface of the protective cover 4 (along the surface opposing the upper surface of the bed 13) or secured to the column 3 so as to provide clearance to the inner surface of the protective cover 4. The chip intrusion stopper 11 is not particularly limited to an integral structure or a combination of separate structures. Further, the chip intrusion stopper 11 may be made of any material that permits the machine tool to operate normally. Furthermore, the size of the clearance between the chip intrusion stopper 11 and the inner surface of the protective cover 4 may be arbitrarily set within a range that permits the saddle 2 to move normally.

As mentioned above, the first wiper 12, which removes chips accumulated on the first linear motion guides 5 (linear motion block 5a and linear motion rail 5b) and linear motion rail mounting surface 6a disposed inside the protective cover 4 or on the tilted portion 6b of the linear motion rail mounting surface, is directly secured to the saddle 2 or secured to a member fastened to the saddle 2.

Figure 8:
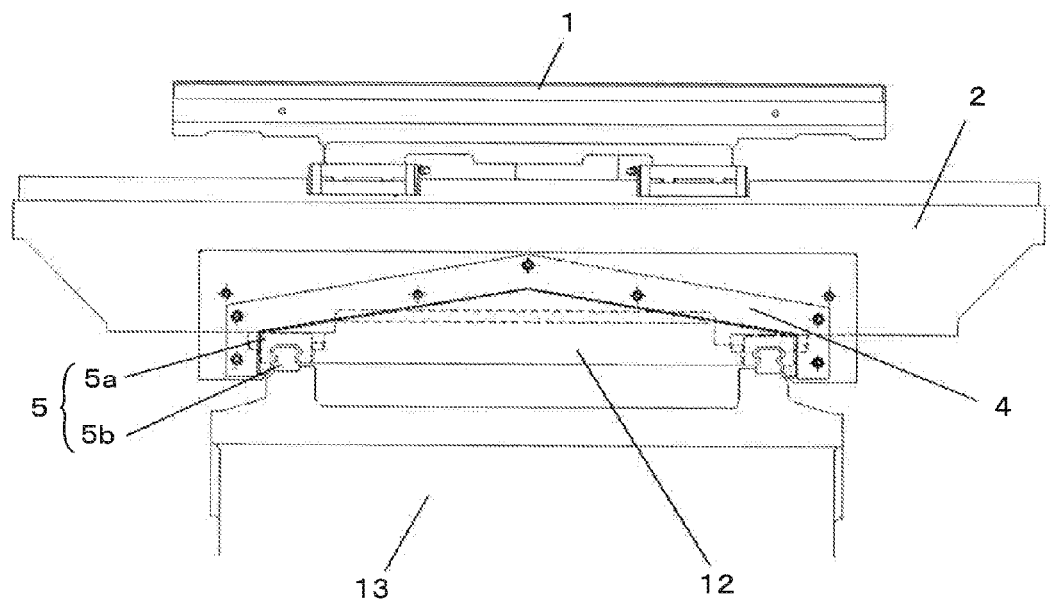
FIG. 8 is a diagram illustrating an example of a wiper mounted on the saddle of the machine tool shown in FIG. 1.
Figure 9:
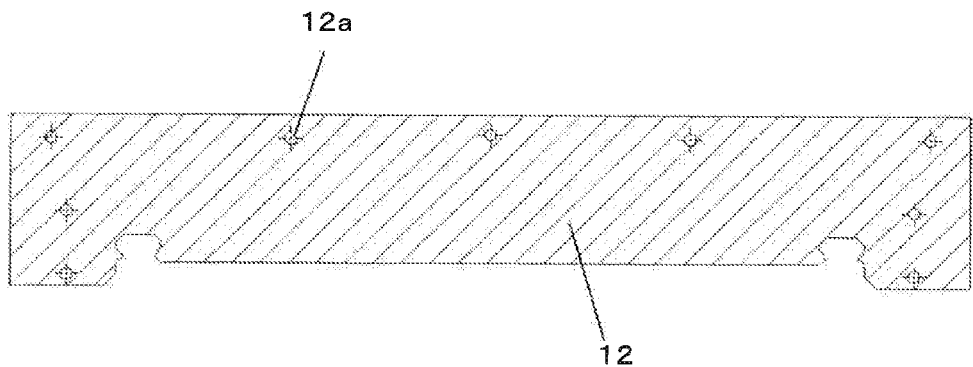
FIG. 9 is an enlarged view of the wiper shown in FIG. 8.

An example of the first wiper 12 attached to the saddle 2 will now be described with reference to FIGS. 8 and 9.

The first wiper 12 is secured with screws or other fastening means to a surface of the saddle 2 that opposes the column 3. The protective cover 4 is secured to the saddle 2 through the first wiper 12 by using screws or other fastening means.

The first wiper 12 may be secured to the saddle 2 so as to provide a clearance between the first wiper 12 and the first linear motion guides 5, the linear motion rail mounting surface 6a or the tilted portion 6b of the linear motion rail mounting surface. Alternatively, the first wiper 12 may be secured to the saddle 2 so as to slide along the first linear motion guides 5 and linear motion rail mounting surface 6a or the tilted portion 6b of the linear motion rail mounting surface. The first wiper 12 is not limited to an integral structure or a combination of separate structures. Further, the first wiper 12 may be made of any material that permits the machine tool to operate normally. Furthermore, the size of the clearance may be arbitrarily set within a range that permits the saddle 2 to move normally.

Even when the chips enter the inside of the protective cover 4 and accumulate on the linear motion rail mounting surface 6a, the tilted portion 6b of the linear motion rail mounting surface, or the guide surface of the first linear motion guides 5, and the accumulated chips are pushed by the protective cover 4 during the movement of the protective cover 4 and moved toward the column 3, the above-described method enables the chip intrusion stopper 11 to prevent the chips from dropping into the space formed under the column 3.

Further, as described above, when the protective cover 4 is attached to the saddle 2 through the first wiper 12, the first wiper 12 is capable of removing the chips accumulated on the first linear motion guides 5, the linear motion rail mounting surface 6a, or the tilted portion 6b of the linear motion rail mounting surface by scraping them off.

Meanwhile, even when the protective cover 4 is directly attached to the saddle 2 (instead of being attached to the saddle 2 through the first wiper 12), the chip intrusion stopper 11 secured to the column 3 enters the inside of the protective cover 4 and inhibits the chips accumulated on the linear motion rail mounting surface 6a, the tilted portion 6b of the linear motion rail mounting surface, or the guide surface of the first linear motion guides 5 from intruding into the protective-cover intrusion space 15 formed for the column 3.

The invention claimed is:
1. A machine tool, comprising:
  a column erected on a bed;
  a saddle supported by a guide mounted on the bed is configured to move in a direction toward or away from the column;
  a protective cover secured to the saddle, moveable together with the saddle to enter or leave a cavity formed under the column, and configured to protect the guide; and
  a stopper attached to one of (i) the column, (ii) a member connected to the column, (iii) the bed, and (iv) a member connected to the bed, wherein
the stopper faces a surface of the protective cover that opposes the bed, and
the stopper is configured to inhibit chips from entering the cavity formed under the column.

2. The machine tool according to claim 1, further comprising:
a wiper mounted on the saddle or the member connected to the saddle, and configured to scrap off the chips,
wherein
the wiper faces
the guide,
a surface for mounting the guide on the bed, or
a tilted portion of the surface for mounting the guide.

3. The machine tool according to claim 1, wherein the stopper is a flat plate.

4. The machine tool according to claim 1, wherein the stopper has an outer circumference matching an inner shape of the protective cover.

5. The machine tool according to claim 4, wherein the stopper is slidable along the inner surface of the protective cover.

\* \* \* \* \*